June 12, 1934. J. F. JAWOROWSKI 1,962,740
PRESSURE CONTROL DEVICE
Filed May 10, 1932 3 Sheets-Sheet 1

INVENTOR
JOSEPH F. JAWOROWSKI
BY Fisher
ATTORNEY

June 12, 1934.  J. F. JAWOROWSKI  1,962,740
PRESSURE CONTROL DEVICE
Filed May 10, 1932    3 Sheets-Sheet 3

INVENTOR
JOSEPH F. JAWOROWSKI
BY
Fisher, Moores Mooney
ATTORNEY

Patented June 12, 1934

1,962,740

UNITED STATES PATENT OFFICE 1,962,740

PRESSURE CONTROL DEVICE

Joseph F. Jaworowski, Cleveland, Ohio

Application May 10, 1932, Serial No. 610,372

2 Claims. (Cl. 137—53)

My present invention relates to improvements in pressure control devices and is particularly intended for controlling the pressure produced by pumps or similar mechanism, used in conveying fluids. In devices of the above character the discharge end of the line conveying the fluid is frequently suddenly shut off and at other times partially closed, while the pump or similar mechanism continues in operation, until a definite pressure has been established. The fluid is then caused to circulate idly through the pump body, due to the action of a check or relief valve arranged between the delivery end of the pump and the discharge end of the line for continuing the circulation of the fluid even though the discharge opening be closed.

Ordinary check or relief valves when employed for the purpose just described are subjected to considerable wear and are also very noisy due to the quick action of the valve particularly on its reseating movement. The primary object of this invention is to produce a check or relief valve, which is retarded on its opening and reverse or seating movements, for preventing wear and chattering or other noise. In carrying out this improvement I have provided a check or relief valve with a dash pot like dampening device, which retards the reciprocatory movement of the valve during its opening and closing movements.

Another object of my invention is to provide a check or relief valve of the character described which is composed of relatively few parts, is therefore simple in construction and assembly and is cheap to manufacture.

With these and other objects in view, the invention consists in the construction and novel combination of parts hereinafter fully described, illustrated and pointed out in the claims hereto appended, it being understood that various changes in the form, proportion, size and minor details of construction within the scope of the claims may be resorted to without departing from the spirit of the invention.

In the drawings:

Figure 6 shows the head with the adjustable spring seat, Figure 7 the valve and spring, and Figure 8 the valve body with the guiding and dampening plunger for the valve;

Figure 1:
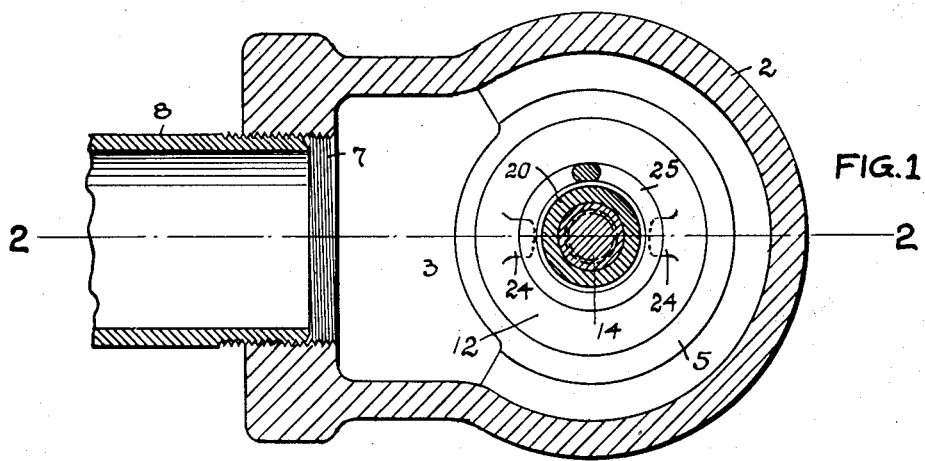
Figure 1 is a horizontal sectional view through the check or relief valve according to the invention, the section being taken on line 1—1 of Figure 2.
Figure 2:
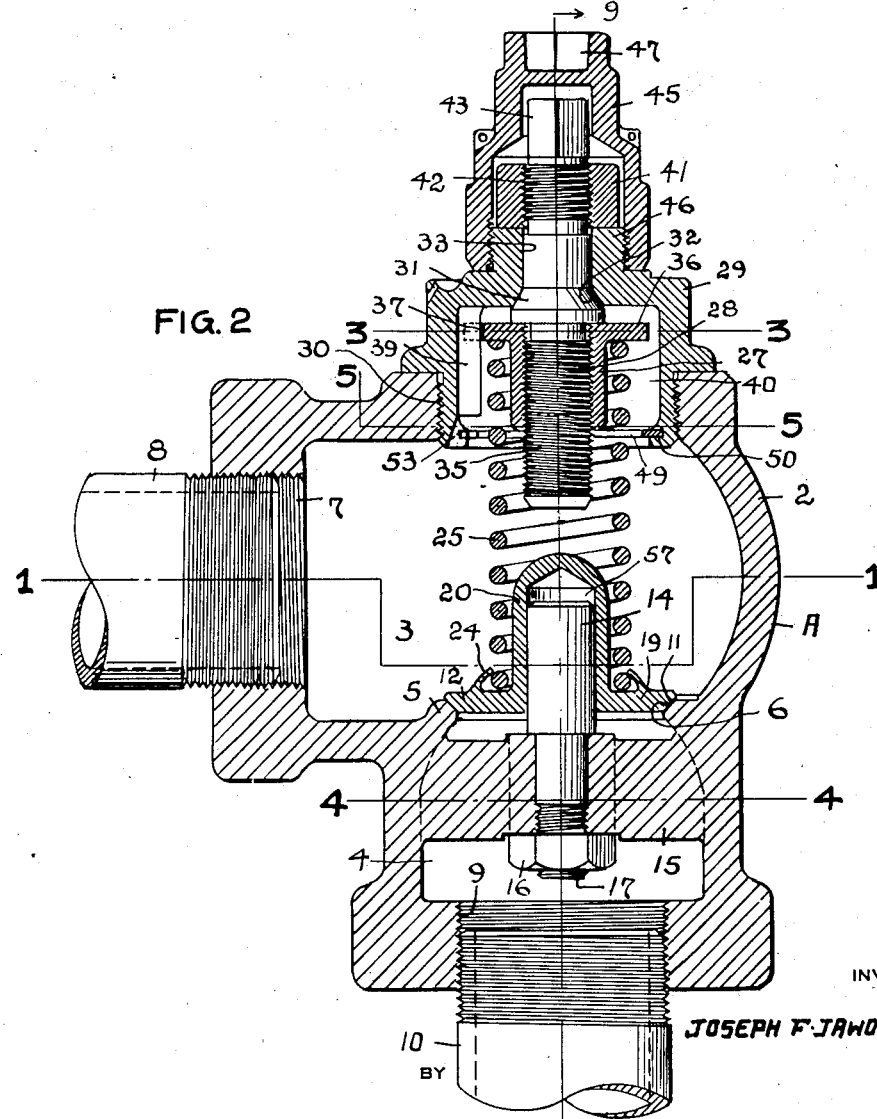
Figure 2 is a vertical sectional view on line 2—2 of Figure 1.
Figure 3:
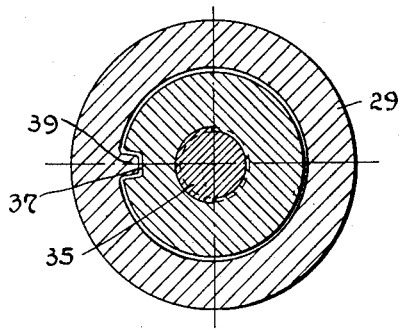
Figure 3 is a horizontal sectional view on line 3—3 of Figure 2.
Figure 4:
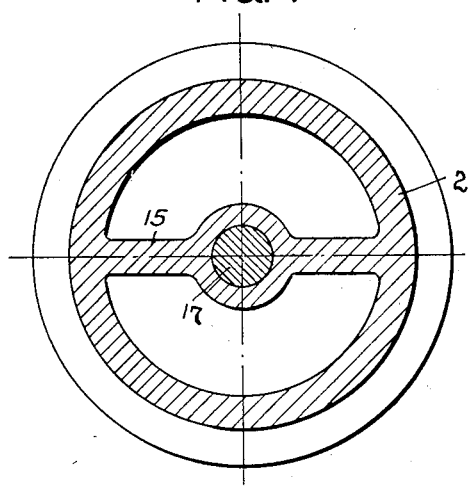
Figure 4 is a horizontal sectional view on the line 4—4 of Figure 2.

As shown the relief valve A embodies a hollow cast valve body or housing 2 subdivided into two compartments 3 and 4 by means of a horizontal division wall 5. Compartments 3 and 4 communicate with each other through a valve controlled opening 6, in wall 5, and also communicate with pipes 8 and 10 respectively, which serve as inlet and outlet connections for said valve body. Thus compartment 3 is provided with a threaded opening 7, for receiving and supporting pipe 8, and compartment 4, is provided with a threaded opening 9 threadedly engaged by pipe 10.

The outer edge of opening 6 through wall 5 is conically recessed to form a valve seat 11 for a valve 12, slidably sleeved upon and supported by a valve guide 14 of plunger like form, in turn supported upon a transversely disposed integral rib 15 within compartment 4. A nut 16 screwed upon the threaded end 17 of guide 14 rigidly secures the guide to rib 15. Valve 12 embodies a disk like portion 19 and a hollow cylindrical extension or guide portion 20 sleeved upon the plunger-like guide 14 and cooperating therewith to check or dampen the seating and opening reciprocatory movements of the valve. Cylindrical extension 20, during its relative movement to and fro upon guide 14 acts as a dash-pot. A clearance between guide 14 and the inner wall 22 of said cylindrical extension of approximately one to two thousandths of an inch, permits of air or liquid being sucked or pressed through the slight space thus provided during movement of valve 12 with respect to its guide 14. As the movement or flow of the liquid or air into or out of the cylindrical extension is frictionally retarded, due to the small clearance, it follows that the movement of valve 12 will be correspondingly retarded.

Disk like portion 19 of valve 12 is formed with two oppositely arranged finger portions 24 to permit attachment of a compression spring 25 and joint removal of the valve and spring, if so desired. Spring 25 seats at one end against valve 12, and at its opposite end engages a flanged backing and adjusting nut 27, threadedly mounted upon a shaft 28, rotatably mounted in and extending through a head 29, in turn screw engaged with a threaded opening 30 in body 2. A cone shaped portion 31 on shaft 28 seated in a cone-shaped recess 32 of head 29, prevents the shaft from being drawn through the opening 33 in head 29 through which the shaft extends, and insures a tight seal at this point. Nut 27 is threadedly mounted upon the inner threaded end 35 of shaft 28 and the flange 36 on the nut against which the upper or outer end of spring 25 bears is radially slotted at 37 for slidable engagement with a key or rib 39 extending into the hollow portion 40 of head 29. The spring backing member or nut is thus locked against rotary movement. A nut 41 engages the outwardly extending threaded portion 42 of shaft 28 and permits the latter to be securely locked to head 29, when desired adjustments have been made. The end 43 of portion 42 is square to provide means for rotating the shaft 28 for axial shifting of nut 27 and therewith change of tension of spring 25. A cap 45 covers the end 43 of shaft 28 and is screw engaged with the threaded neck 46 of head 29. Cap 45 is at its top portion provided with a rectangularly shaped recess 47 adapted to be brought into engagement with end 43 of shaft 28, when said cap is unscrewed and turned upside down, to rotate the shaft 28 and adjustable nut 27 without other tools.

The adjustment of nut 27 is limited in opposite directions by its flange 36, engaging at the end of its upward movement shoulder portion 48 on shaft 28 and at the end of its downward movement a split ring 49 seated in a recess 50 within the inner wall of the lower hollow end of head 29. A slight cut out portion 53 permits the prying loose of ring 49 to permit disassembly of head 29.

During the operation of the valve fluid enters through pipe 10 into chamber 4, and when the pressure of the fluid overcomes the tension of spring 25, valve 12 will be lifted from its seat. This valve movement creates a vacuum in chamber 57 which tends to counteract the effect of the fluid pressure and correspondingly retard opening of the valve. As the valve 12 opens the pressure of the fluid decreases and therefore spring 25 tends to force valve 12 back upon its seat. This movement is opposed by the fluid in chamber 57 previously sucked thereinto which must first be forced out before the valve can close. Seating of the valve is thus checked and softened to such a degree that practically all noise or chattering will be eliminated. Shaft 28 when rotated causes the spring backing member 27 to move longitudinally on the shaft, thus varying the tension of spring 25.

Figure 5:
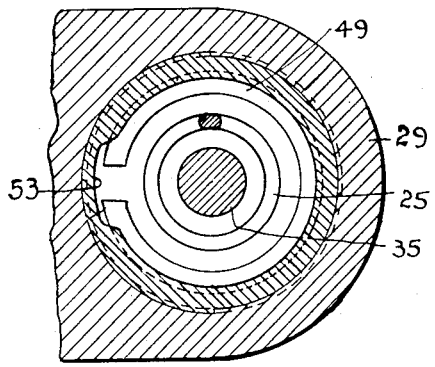
Figure 5 is a horizontal view on line 5—5 of Figure 2.
Figure 6:
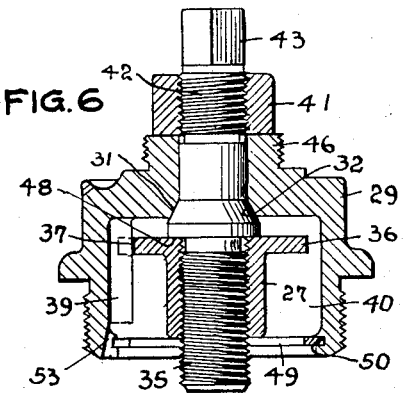
Figures 6 through 8 show sectional views of the check or relief valve disassembled. Thus
Figure 7:
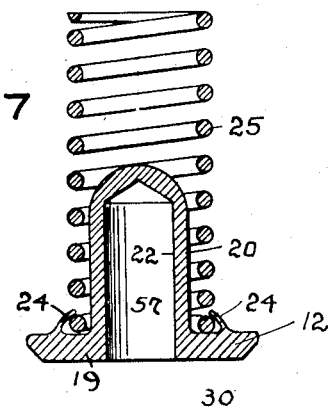
Figure 8:
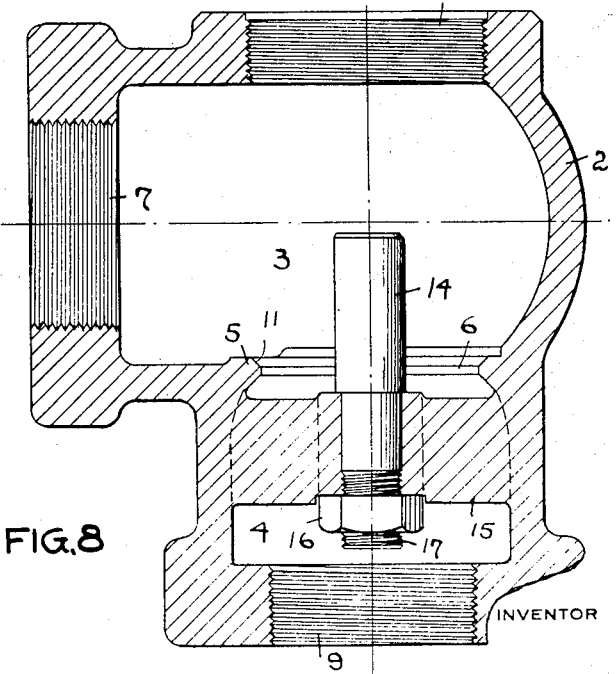
Figure 9:
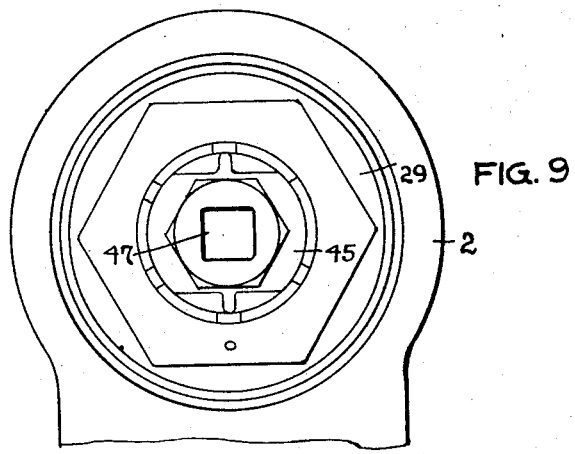
Figure 9 is a plan view of the valve.
Figure 10:
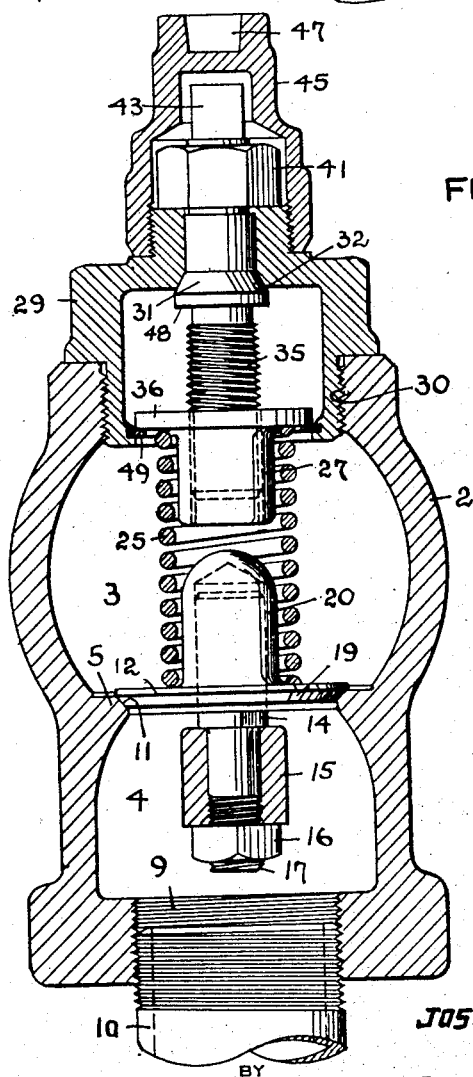
Figure 10 is a sectional view on line 9—9 of Figure 2 with the adjusting nut for the spring in lowest position.

Head 29 and shaft 28 may be jointly removed and thereafter spring 25 and valve 12, which are interengaged with each other as previously described, may also be jointly withdrawn for inspection or repairs. See Figures 5 through 7.

Having thus described my invention:
What I claim is:

1. A pressure controlling device, comprising a valve housing, subdivided into two communicating compartments, a head portion threadedly connected with said valve housing, a spring actuated valve for controlling communication between said two compartments, guiding means centrally extending into said valve and cooperating therewith in retarding the seating of said valve, means slidably and non-rotatably arranged within said head portion for adjusting the tension of said spring including a screw threaded shaft freely rotatably seated in said head portion and provided with a wrench engaging head extended through said head portion, and cover means for said extended head secured to said head portion and including a wrench engaging socket at its upper outer end for said head of said shaft.

2. A pressure controlling device, comprising a valve housing, subdivided into two communicatory compartments, a head portion threadedly connected with the wall of one compartment of said housing, a spring actuated valve member for controlling communication between said two compartments embodying a valve portion and a hollow cylindrical extension axially aligned with said valve portion and forming a cylindrical chamber open at its bottom in the plane of said valve member, guiding means secured to said valve housing and embodying a plunger extending through said valve member into the cylindrical extension thereof, vertically adjustable means slidably and nonrotatably secured to said head portion for adjusting the tension of said spring for said valve member, and a split ring, seated within a recess arranged within said head portion for limiting the vertical movement of said adjusting means for said spring toward said valve member.

JOSEPH F. JAWOROWSKI.